US 6,496,580 B1

(12) United States Patent
Chack

(10) Patent No.: US 6,496,580 B1
(45) Date of Patent: Dec. 17, 2002

(54) METHOD AND APPARATUS FOR SERVICING QUEUED REQUESTS

(75) Inventor: Michael A. Chack, San Jose, CA (US)

(73) Assignee: Aspect Communications Corp., San Jose, CA (US)

(*) Notice: Subject to any disclaimer, the term of this patent is extended or adjusted under 35 U.S.C. 154(b) by 0 days.

(21) Appl. No.: 09/325,502

(22) Filed: Jun. 3, 1999

Related U.S. Application Data

(60) Provisional application No. 60/121,212, filed on Feb. 22, 1999.

(51) Int. Cl.$^7$ ................................................ H04M 3/00
(52) U.S. Cl. ........................... 379/266.01; 379/265.02; 379/309
(58) Field of Search ....................... 379/212.01, 266.01, 379/265.02, 309

(56) References Cited

U.S. PATENT DOCUMENTS 5,384,841 A * 1/1995 Adams et al. .......... 379/127 X
6,263,065 B1 * 7/2001 Durinovic-Johri et al. ............ 379/309 X
6,295,354 B1 * 9/2001 Dezonno ................ 379/309 X

* cited by examiner

Primary Examiner—Creighton Smith
(74) Attorney, Agent, or Firm—William D. Davis; Davis & Associates

(57) ABSTRACT

Methods for servicing queued requests include the step of queueing at least one request for an initial wait time until at least one agent is available for accepting the queued request. A delay element is provided so that assignment of the queued request is delayed for a delay time. The queued request is then assigned to an available agent. In one embodiment, the delay time is a pre-determined availability pendency time independent of the initial wait time. In another embodiment the request is delayed until a pre-determined queue time has elapsed. In another embodiment, the request may be delayed up to a pre-determined availability pendency time as long as a pre-determined queue time is not exceeded. The delay element need not change the queue discipline. Various queue disciplines including first-in-first-out (FIFO), group FIFO, and modified group FIFO are described for a queueing mechanism incorporating a delay element. The queued requests may represent requests for service to respond to any of a variety of sources including electronic mail communications, facsimile communications, internet communications, telephone communications, etc. In one embodiment, the methods are implemented by an automated call distributor.

20 Claims, 6 Drawing Sheets

METHOD AND APPARATUS FOR SERVICING QUEUED REQUESTS

CROSS-REFERENCE TO RELATED APPLICATION

This application claims the benefit of U.S. Provisional Application No. 60/121,212, filed Feb. 22, 1999.

FIELD OF THE INVENTION

This invention relates to the field of communication systems and computer telephony. In particular, this invention is drawn to methods and apparatus for servicing queued requests.

BACKGROUND OF THE INVENTION

Call centers enable queuing of customer calls for subsequent connection to agents for handling the customer's requests. Customer calls are queued until an agent is available to handle the telephone call. An automatic call distributor (ACD) is typically used to queue the calls and subsequently route them to agents subject to implementation specific rules when availability permits.

Typical ACD routing rules emphasize distributing incoming calls among agents in a manner that 1) reduces the initial response time before the call is answered and 2) balances the call load among the agents. This often results in assigning the calling customer to the first available agent with a first-in-first-out queue discipline.

One disadvantage of this approach is that the first available agent may not be the agent best suited for handling the customer. Moreover, if that first available agent has skills particularly needed to handle a subsequent customer in the queue, the subsequently queued customer may experience undesirable extended wait periods while the first caller is being serviced. Alternatively, assigning a customer the first available agent may undesirably increase that customer's total service time if the customer has to be subsequently forwarded to another agent for handling.

SUMMARY OF THE INVENTION

In view of limitations of known systems and methods, one of the objectives of the present invention is to provide methods and apparatus to enable improved matching between requests for service and the agents servicing the requests.

Methods for servicing queued requests include the step of queueing at least one request for an initial wait time until at least one agent is available for accepting the queued request. A delay element is provided so that assignment of the queued request is delayed for a delay time. The queued request is then assigned to an available agent.

In one embodiment, the delay time is a pre-determined availability pendency time independent of the initial wait time. In another embodiment the request is delayed until a pre-determined queue time has elapsed. In another embodiment, the request may be delayed up to a pre-determined availability pendency time as long as a pre-determined queue time is not exceeded.

The delay element need not change the queue discipline. Various queue disciplines including first-in-first-out (FIFO), group FIFO, and modified group FIFO are described for a queueing mechanism incorporating a delay element.

The queued requests may represent requests for service to respond to any of a variety of sources including electronic mail communications, facsimile communications, internet communications, telephone communications, etc. In one embodiment, the methods are implemented by an automated call distributor.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
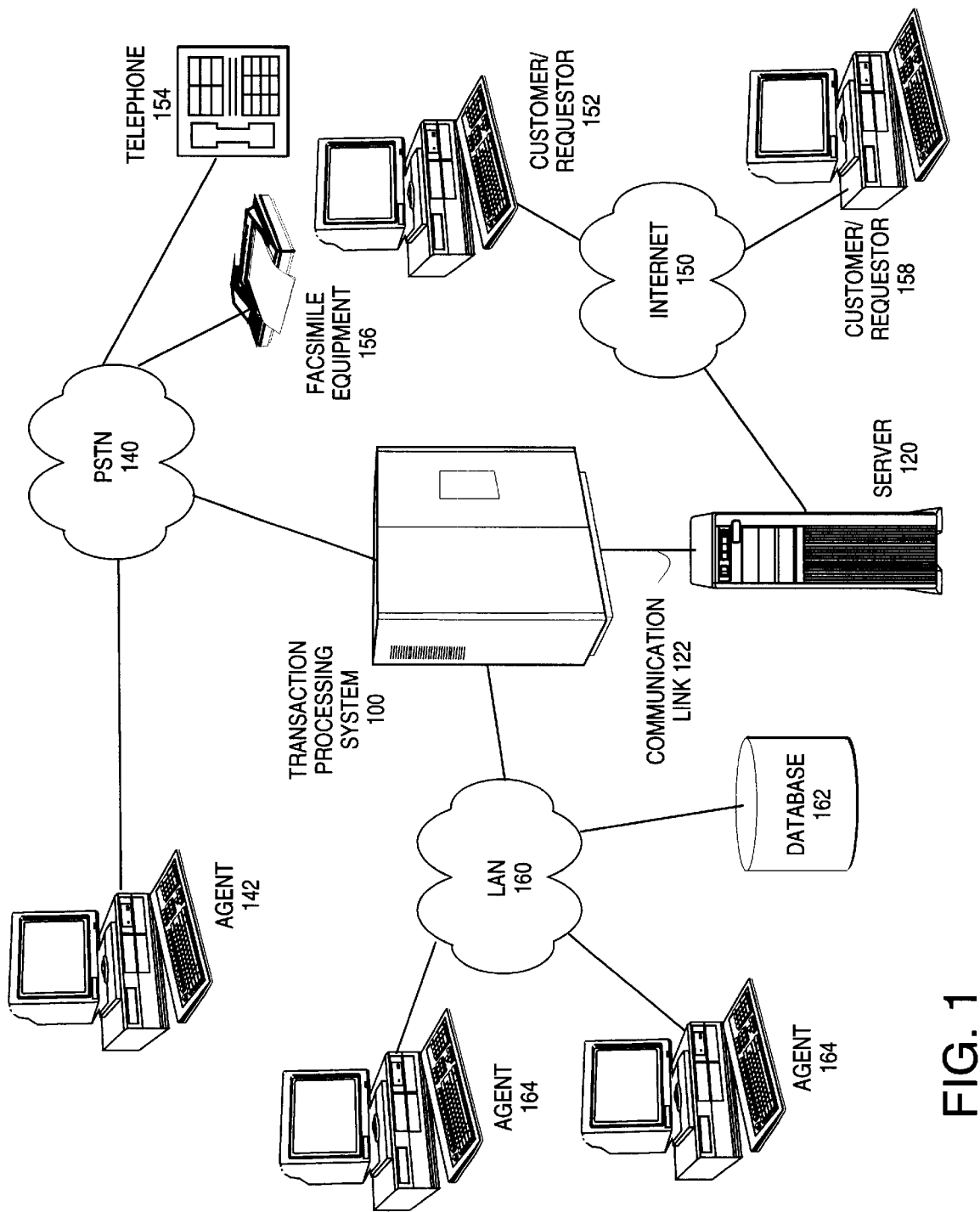
FIG. 1 illustrates one embodiment of a transaction processing environment.

FIG. 1 illustrates a general transaction processing system 100. The transaction processing system 100 enables transaction initiators (e.g., customers/requestors) to be paired with an agent for service using various types of transactions. Exemplary types of transactions include telephone calls, facsimile transmissions, electronic mail, video sessions, or network sessions (e.g., an Internet session). Transaction processing system 100 also permits agents to respond to received requests or to initiate a transaction.

Transaction processing system 100 is coupled to server 120, public switched telephone network (PSTN) 140, and local area network (LAN) 160. Transaction processing system 100 is capable of receiving transactions or requests from PSTN 140, LAN 160, and server 120. Similarly transaction processing system 100 is capable of transmitting transactions to PSTN 140, LAN 160, and server 120.

For example, transaction processing system 100 can receive an incoming telephone call directly from PSTN 140. Another incoming telephone call may be received by server 120 (e.g., a telephone call communicated across Internet 180) and provided to transaction processing system 100 across a communication link 122 or across LAN 160.

Server 120 can operate as a web server, an electronic mail server, a facsimile server, or a video server. In one embodiment, server 120 handles mixed transaction types. In an alternative embodiment, multiple servers are provided such that each is dedicated to one or more types of transaction. For example, an electronic mail server processes transactions conducted by electronic mail. A web server might process all web-based transactions.

In one embodiment, hundreds or thousands of agents (164) are connected to transaction processing system 100 through one or more LANs such as LAN 160. Alternatively, agents may be coupled directly to transaction processing system 100 rather than through LAN 160. Agents may also be coupled to the transaction processing system 100 through PSTN 140 (e.g., agent 142).

Some customers/requestors may access the transaction processing system using Internet 150. Customer/requestor 158 can use an Internet telephone to establish contact with an agent using Internet 150. Alternatively customer/requestor 158 could use electronic mail.

Customer/requestor 154 may communicate with an agent using Internet 150 (e.g., Internet telephone or electronic mail), a telephone 154, or facsimile equipment 156, or some combination of these.

For example, customer/requestor 154 may generate an electronic mail message to server 120 using Internet 150. Server 120 communicates the electronic mail message to transaction processing system 100 across communication link 122. Transaction processing system 100 then handles routing the electronic mail message to the appropriate agent or group of agents for response. The agents may be grouped based on area of expertise (e.g., particular product line), company department, type of support (e.g., sales or technical support). The agent assigned to handle the electronic mail message can respond by another electronic mail message or by telephone, facsimile, or any other type of transaction supported by the transaction processing system and the customer/requestor. In some embodiments, the transaction initiator may request a type of transaction for the agent to use.

Database 162 is used by transaction processing system 100, agents 164 and 142, and server 120. Database 162 may contain information about the transaction processing system, the performance of the system, and the agents and customers that use the system. Database 162 may contain additional information to be associated with transaction requests in order to enable proper routing to the appropriate agent.

The transactions represent requests for service. Typically there are insufficient agents to handle each request immediately. Transaction processing system 100 queues and assigns the various types of requests to agents according to implementation specific rules. In one embodiment, transaction processing equipment 100 is an automated call distributor (ACD).

These transaction requests will be referred to simply as "requests" even though they may be different types and may originate from a variety of sources and have very different resource requirements (in terms of both types of service and knowledge required to respond). The entity servicing the request is referred to as an "agent" or "server." An agent may be human or machine. For example, an agent may be a computer for certain service requests (e.g., a faxback service for a specified document number).

Figure 2:
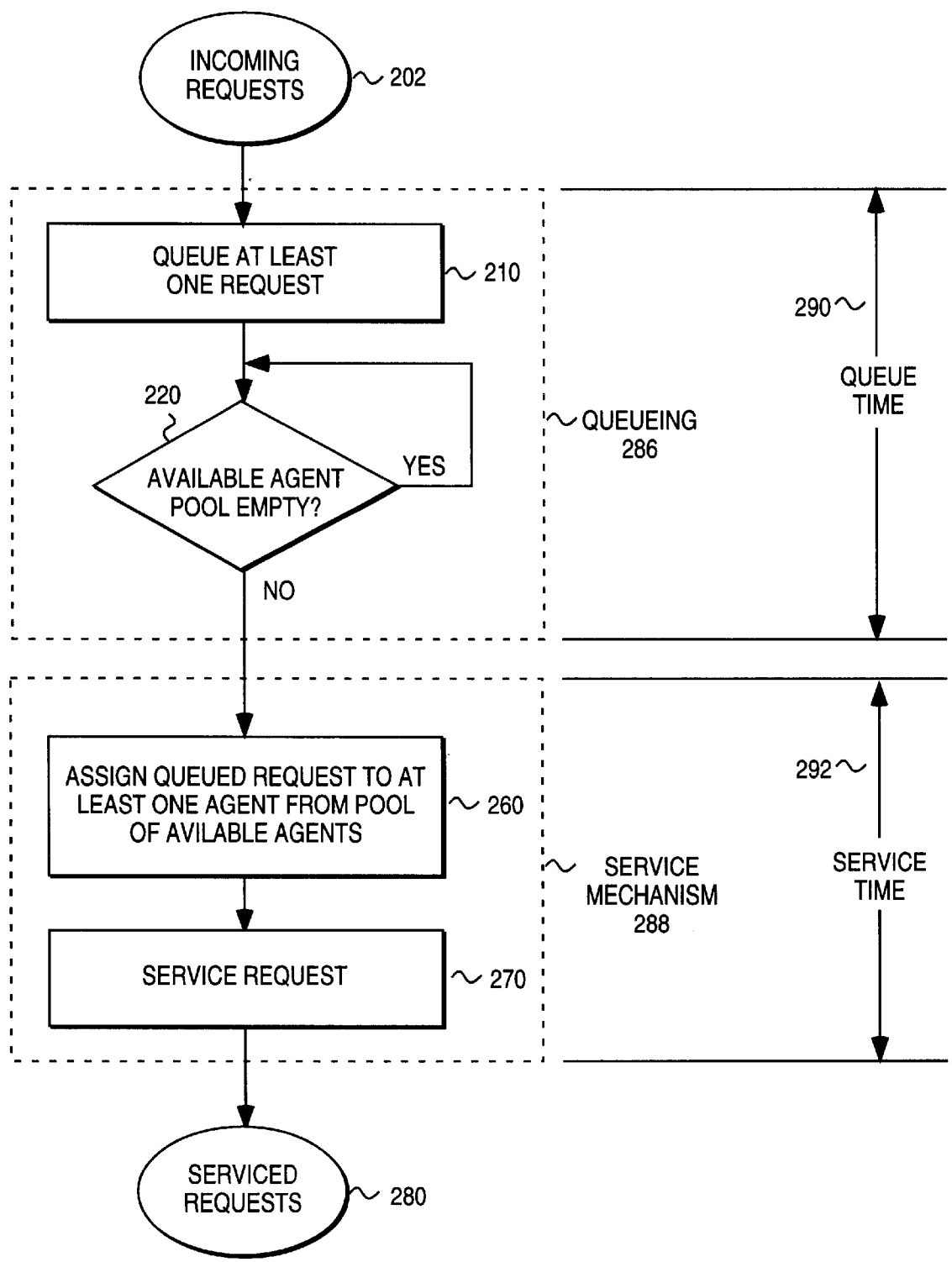
FIG. 2 illustrates a method of processing incoming requests.

FIG. 2 illustrates one embodiment of a typical queuing and servicing process from the viewpoint of a single transaction request. The queuing system 286 receives requests from one or more input sources represented as incoming requests 202. An incoming request is queued in step 210. Step 220 determines if there are any agents able to accommodate the request. As long as the request is pending and no agents are available, the request remains in the queue system 286 waiting for service. The queue time 290 is a measure of the time that a request is pending in the queue system.

As agents become available, the requests are selected from queue system 286 for handling by the service mechanism 288. The request is assigned to an agent in step 260 once at least one agent becomes available. The request is then serviced in step 270 resulting in serviced requests 280.

Traditionally the service time refers to the length of time required by a server to handle the request (i.e., step 270). In the example of FIG. 2, however, the assignment step 260 is presumed to consume negligible time thus the service time 292 reflects the length of time service mechanism 288 requires to handle the request.

The order in which requests are selected from queue system 286 is referred to as the queue discipline. The requests are distributed to agents according to a set of rules. Traditionally, a transaction server such as an ACD queues and distributes requests in a manner designed 1) to minimize the request's queue time, and 2) to balance the call load across agents.

In some transaction processing systems, a large variance in agent skills or knowledge is not required. In a system where the requests tend to have the same resource requirements (e.g., domestic airline reservations) one technique for minimizing queue time is to assign requests to the first available agent using a first-in-first-out (FIFO) queue discipline. Thus requests are assigned in request order to available agents in accordance with the distribution rules. (This does not necessarily imply that the requests are correspondingly assigned to agents in the same order that the agents become available (i.e., agent order).)

The approach of assigning requests to the first available agent may actually result in increased service time, however, if the requests have different resource needs which all agents are not equally capable of meeting. Service time may be substantially increased, for example, if the agent is inefficient or incapable of handling the request.

Skills-based routing may be used to improve the match between requests and the agents assigned to handle the requests especially if additional information about the request is available at the time the assignment decision is made. The request is assigned to an agent based at least in part on information associated explicitly or inferentially with the request. In one embodiment, database 162 of FIG. 1 provides additional information regarding the request to facilitate skills-based routing.

For example, telephone calls are typically accompanied by two types of identification provided by the PSTN. Dialed number information service (DNIS) indicates the telephone number the caller dialed. Automatic number identification (ANI) service indicates the telephone number that the call is initiated from. One or both of the ANI and the DNI can be used to better match the caller with an agent. The geographic location of the caller, for example, can often be inferred from the ANI. The ANI could thus be used in conjunction with database 162 to identify an agent responsible for the geographic region the call originates from.

Alternatively, the ANI can be used to infer particular characteristics about the caller. For example, calls originating from a particular geographic region may often be conducted in another language. Thus database 162 may be used to associate call requests from a particular geographic region with a specific language. The transaction processing system then attempts to assign the call to an agent that has the ability to speak that language.

In another embodiment, instead of geographic regions, the ANI is used to associate a specific caller with a predetermined agent. Thus in a sales application, for example, the ANI may indicate an important customer having prior experience with a specified agent. In one embodiment, the transaction processing system attempts to route the call to the specified agent.

In another embodiment, the transaction processing system 100 uses other applications to proactively determine information about the caller before assigning an agent to the call. For example, in one embodiment transaction processing equipment 100 includes an application to determine financial information about the entity that the ANI is associated with. The application may provide credit information regarding the caller or at least the information associated with the calling number. The call can then be associated with the financial information for the purpose of subsequently routing the call to the agent or pool of agents responsible for handling callers with similar financial traits.

In a sales environment, an agent assigned to represent the caller's geographic area may be better suited to handle the request than an agent unfamiliar with the area. To minimize the caller's queue time and provide skills-based routing, the caller may be assigned to the first agent capable of handling that geographic area. If more that one capable agent is available the call may be routed to a presently available agent consistent with the rules designed to balance call loading across agents.

If other agents that could provide a better request-to-agent match are not presently available, then the request may be handled less inefficiently than it otherwise could have been. Moreover, in a FIFO queue discipline, assigning a presently available agent necessarily makes that agent at least temporarily unavailable for assignment to subsequently queued requests. This in turn may lead to cascading mismatches or less efficient matches between agents and requests.

The rate at which requests are queued and the rate that agents become available from servicing requests are predictable. A Poisson process is commonly used to model a system having requests that arrive randomly but at a certain average rate. Generally, given at least one unavailable agent, the probability that the agent will become available increases over time. Thus in a system with a plurality of agents handling requests (i.e., unavailable agents), the number of available agents tends to increase over time if agents are not assigned queued requests as the agents become available.

In order to enable a better matching of agent skills to requests, a delay element is introduced before assigning queued requests to available agents. The delay element tends to increase the number of available agents. Accordingly, the availability of an agent better suited to handle the request increases. This technique permits the transaction server to make assignment decisions based on a larger pool of available agents.

Figure 3:
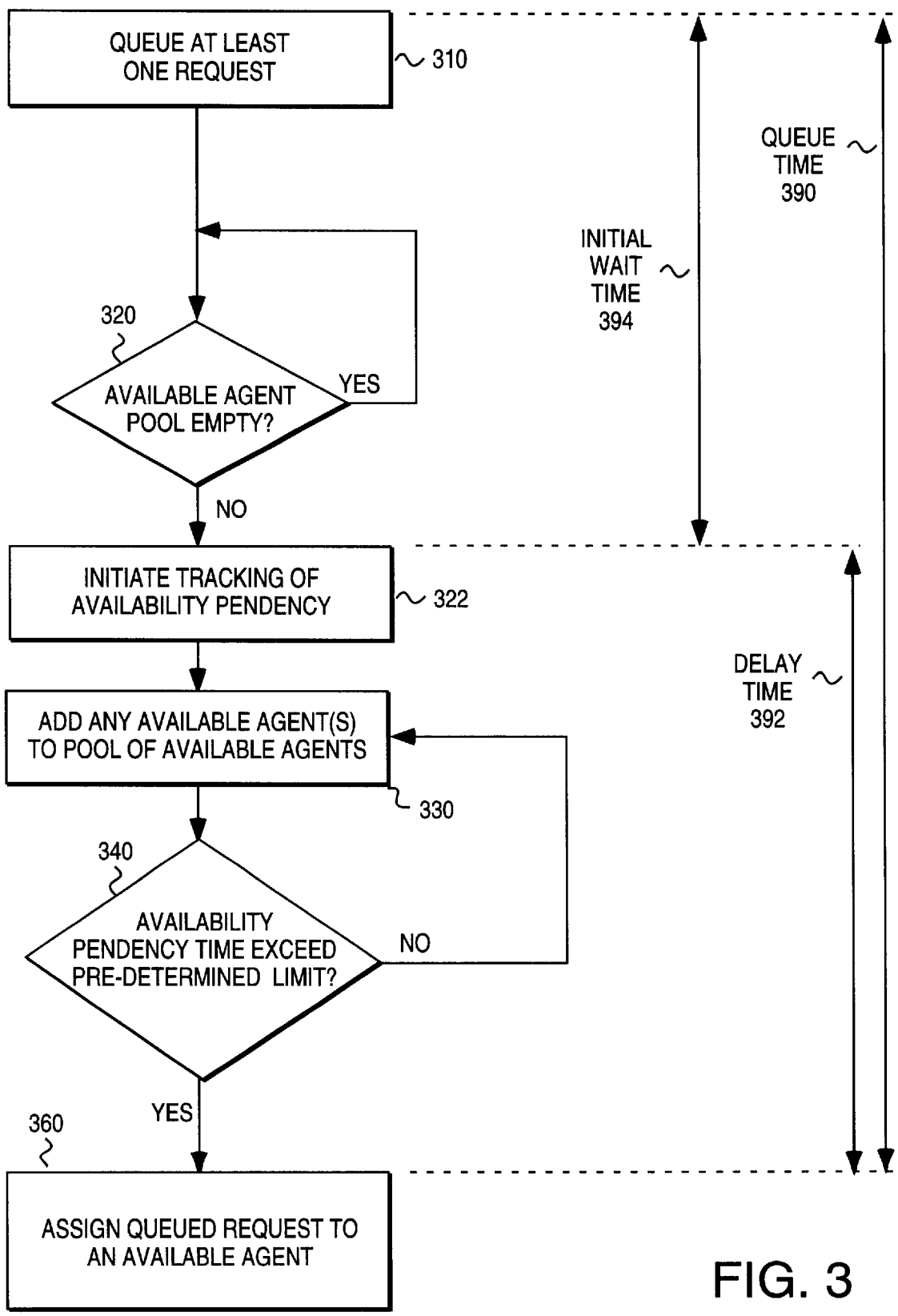
FIG. 3 illustrates one embodiment of a method for servicing queued requests including a delay.
Figure 4:
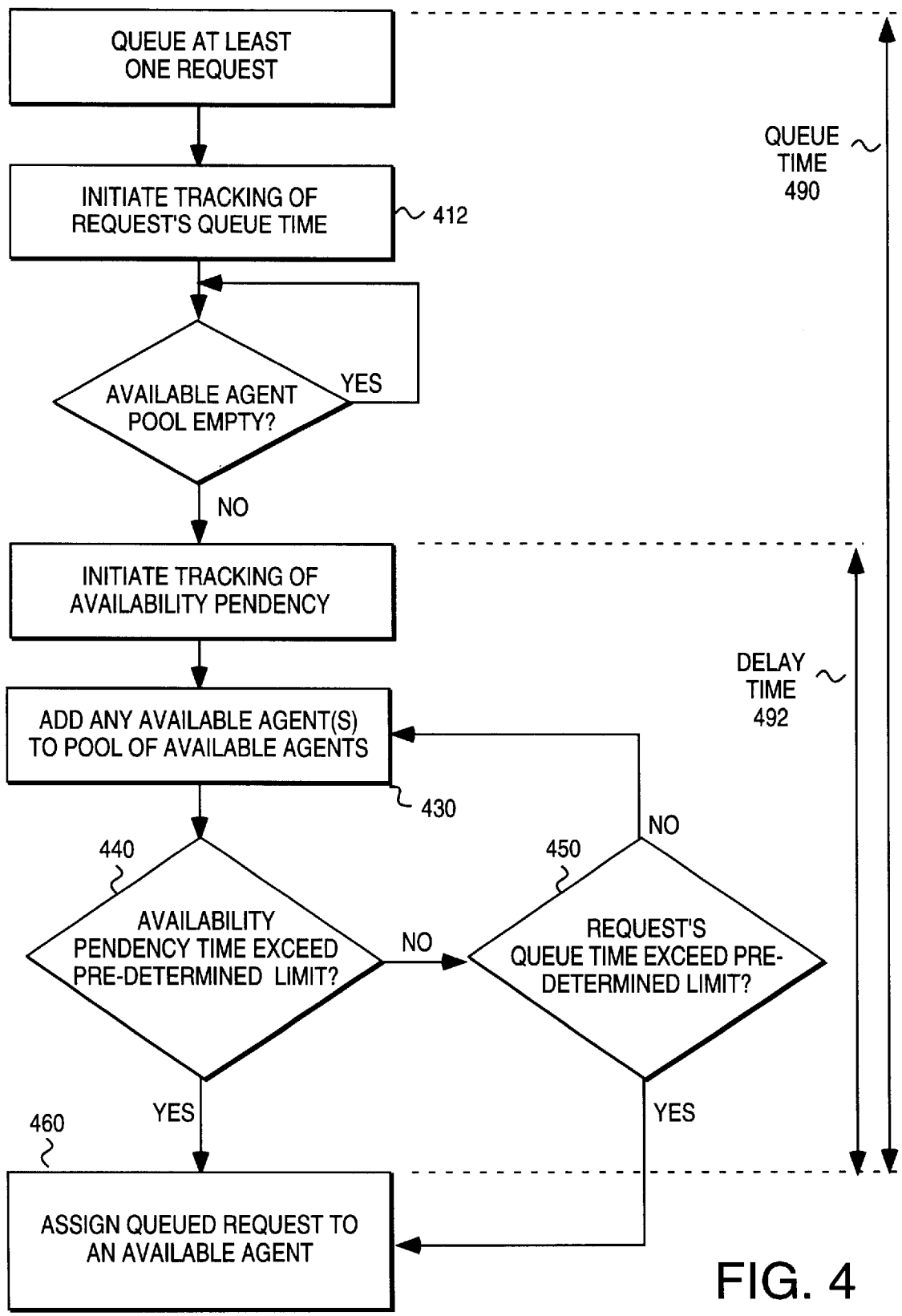
FIG. 4 illustrates another embodiment of a method for servicing queued requests including a delay.
Figure 5:
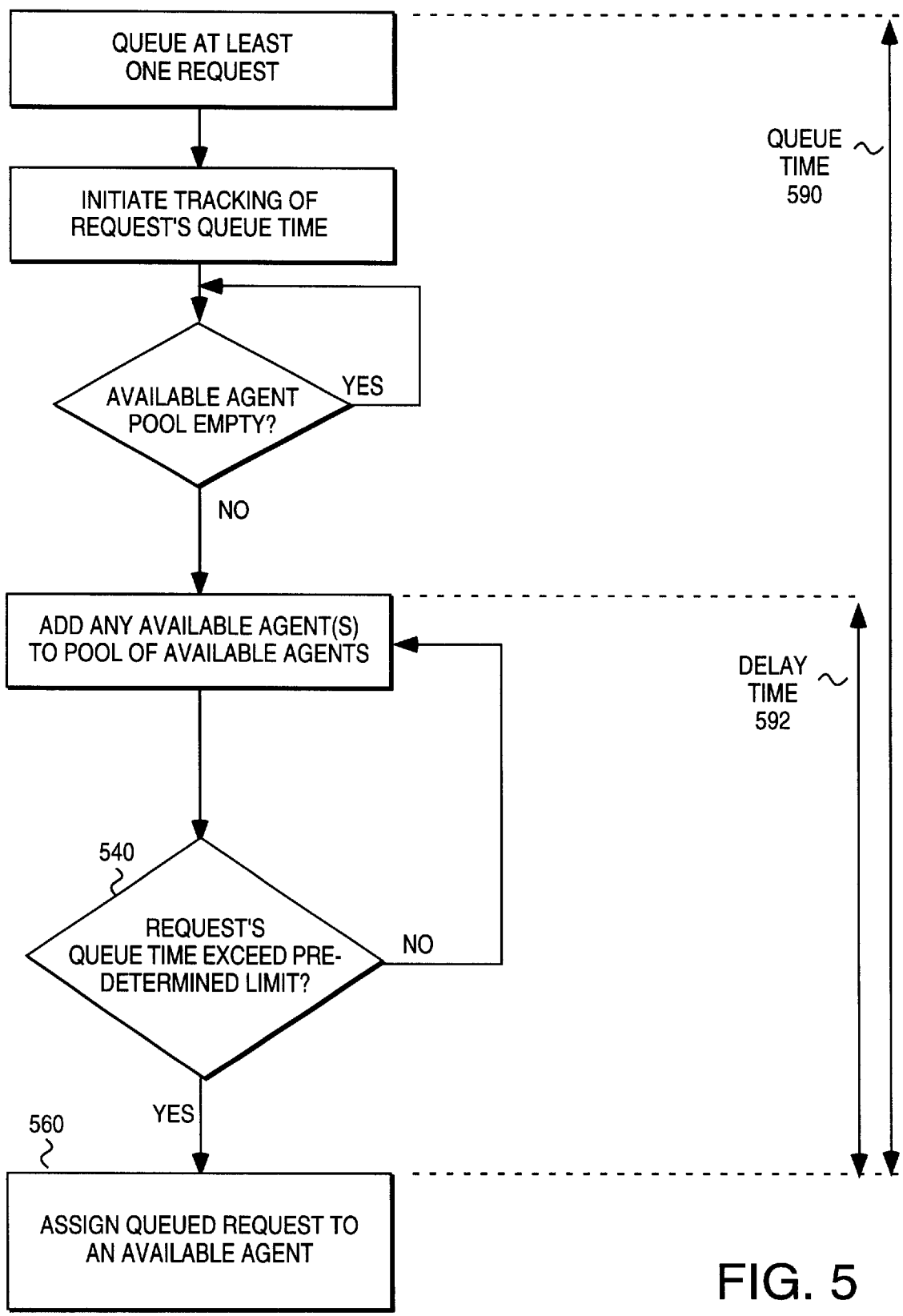
FIG. 5 illustrates another embodiment of a method for servicing queued requests including a delay.

FIGS. 3–5 illustrate various embodiments of a method for servicing requests which introduces a delay element before the service mechanism. Generally, a request is queued for an initial wait time until at least one agent is available for servicing the request. Assignment of the queued request is delayed for a delay time. The delayed queued request is then assigned to an available agent. The delay element effectively forces the system to wait a predetermined amount of time before assigning the request to any agents even if an agent is available.

FIG. 3 illustrates one embodiment of a method for servicing requests incorporating a delay element. The process begins with at least one request in the queue in step 310. At least one agent must be available for handling the queued request, thus step determines if any agents are available before proceeding. Step 320 is repeated until at least one agent is available. The time that elapses between the queueing of a request and the existence of an available agent is referred to as the initial wait time 394.

Once at least one agent is available step 322 initiates tracking of the availability pendency. This might be accomplished with a timer or by logging a time reference so that an elapsed time can be determined. The availability pendency time is the elapsed time that the request pends after an agent is available for handling the request. Step 330 explicitly indicates agents may become available for assignment as time passes.

The delay element of FIG. 3 measures the delay time 392 by the amount of time that has elapsed since an agent became available. (Steps 322–330 do not contribute to the delay time). If a predetermined availability pendency time has not elapsed as determined by step 340, then the request must wait. Steps 330–340 are repeated until the availability pendency time exceeds a pre-determined limit thus allowing more agents to be added to the pool of available agents. The request is then assigned to an agent for servicing in step 360.

The delay element of FIG. 3 increases the amount of time a request pends once an agent becomes available without regard to the initial wait time (i.e., the amount of time the request was pending before an agent became available). If substantial wait periods are incurred before agents become available the resulting queue time 390 might increase beyond desirable limits. Callers, for example, may hang up. Other types of transactions may unnecessarily time-out before completion.

FIG. 4 illustrates an alternative embodiment of the delay element with upper limit controls on the queue time. Step 412 is added to track the request's queue time.

The delay time 492 is determined predominately by steps 440 and 450. Step 440 determines if the availability pendency time has exceeded a pre-determined limit. If so, then the request is assigned to an available agent in step 460. If not, however, step 450 determines if the request's queue time 490 has exceeded a predetermined limit. If so, then processing may continue with step 460. Otherwise steps 430–460 are repeated until one of the two conditions is met. Step 450 ensures that if agents are available, a request will be assigned to an agent in step 460 when the request's queue time exceeds a pre-determined limit even if agents have not otherwise been available for the pre-determined availability pendency time. Thus the delay time 492 will not exceed the pre-determined availability pendency limit and will decrease as the initial wait time increases.

FIG. 5 illustrates another embodiment of the delay element. The delay time 592 is a function of the queue time 590. Step 540 determines if the request's queue time has exceeded a pre-determined limit. The queued request is assigned to an available agent for servicing in step 560 only after a pre-determined queue time has elapsed.

The delay element of FIGS. 3–5 measures the delay time by different thresholds. The delay element of FIG. 3 extends the request's queue time by a static pre-determined availability pendency time after an agent is available. Thus the availability pendency time is a pre-determined value independent of an initial wait time or queue time.

The additional delay of FIGS. 4–5 is dynamic in that it is dependent upon the initial wait time before any agents became available. FIG. 4 extends the queue time by a predetermined availability pendency period as long as a pre-determined queue time is not exceeded. The delay of FIG. 5 ensures that a request is delayed until a pre-determined queue time has elapsed when agents are available.

Although the delay element tends to increase the queue time (first order effect), the delay element tends to increase the number of agents available for servicing requests and thus improves the chances of having a is better match between agents and requests. This in turn may result in lower queue times (second order effect). Moreover, a better match between agents and requests may result in fewer "dropped" requests (e.g., caller hangs up) and better-served clients.

The methods of FIGS. 3–5 need not affect the queue discipline (i.e., the order in which transactions or requests are selected for servicing). Moreover, the delay element can be added without affecting any implementation specific rules regarding the distribution of calls. Thus if the queue is a FIFO queue, the implementation of the methods of FIGS. 3–5 need not affect the FIFO nature of the queue. Generally the methods of FIGS. 3–5 increase the number of agents available for servicing a particular transaction and thus increases the probability of finding a good "fit" between the transaction and the server.

The methods of FIGS. 3–5 can be used to enable better skills matching in a modified FIFO queue discipline. A FIFO queue with skills-based routing might consider the "best" fit between available servers and a currently selected transaction on a transaction-by-transaction basis without consideration to pending subsequent transactions.

One variation of the standard FIFO queue discipline is to find the best fit between a group of transactions and the pool of available agents. The FIFO nature could be preserved in that the longest pending transaction would be assigned an agent no later than subsequently queued (i.e., more recent) transactions in the queue. Thus the queue discipline is still FIFO, but may be more accurately referred to as "group FIFO" given that individual transactions of a group of transactions are analyzed and assigned for service substantially simultaneously.

The cost function used to determine which server or agent is best suited for handling a particular request may result in a different assignment of agents to requests when groups of transactions are simultaneously considered. In general, the cost function should select an assignment that results in the best fit for the group.

In one embodiment, the size of the group of requests under consideration is "shrunk" when necessary to preserve the FIFO nature of the queue with respect to individual transactions. For example, no two transactions in a group can be assigned to the same agent. Thus if two transactions within the same group can only be handled by a particular agent, then one of the transactions must be deferred for subsequent assignment in another cycle. In one embodiment, all requests queued subsequent to the first request that cannot be serviced are held for a subsequent assignment cycle. Thus the request group effectively shrinks in order to preserve the FIFO nature of the queue. In a given assignment cycle, assigning any of the requests subsequent to the first request that could not be accommodated would result in a non-FIFO queue discipline.

Figure 6:
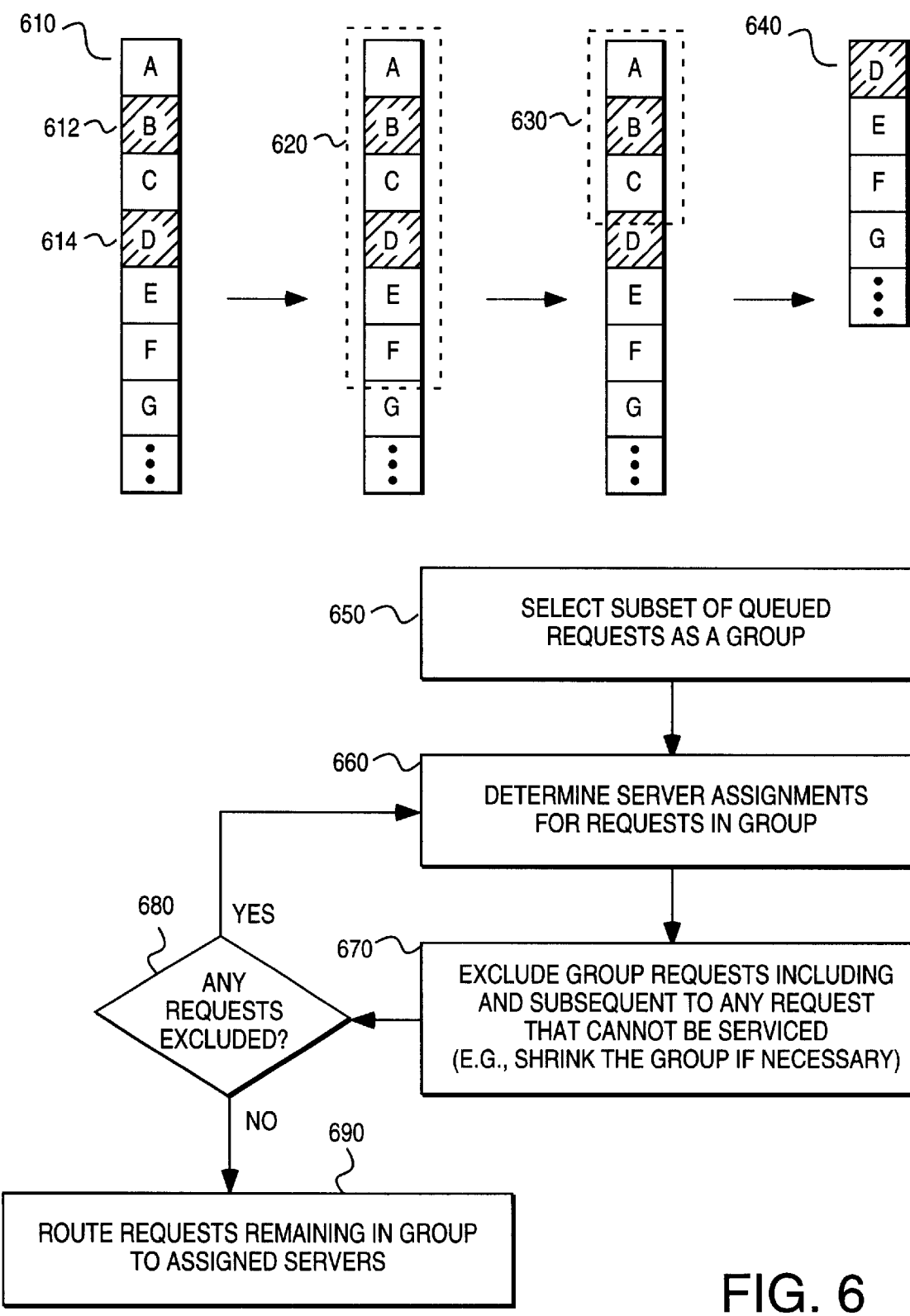
FIG. 6 illustrates one embodiment of a method of servicing delayed queued requests according to a group FIFO queue discipline.

FIG. 6 illustrates the group FIFO queue discipline. The queue 610 includes at least 7 transactions. Queue 610 is a FIFO queue such that each element has been pending at least as long as its successors proceeding from top to bottom (i.e., transaction 612 has been pending at least as long as transaction 614).

In step 650, a subset 620 of queued transactions is selected for assignment as a group. In one embodiment, the size of the subset or group varies in accordance with the number of available agents or servers. In particular the size of the group can not exceed the number of available agents. In this example, group 620 is composed of six transactions.

The tentative agent assignment for each of the transactions of the group is determined in step 660. Step 670 excludes from the group all requests including and subsequent to the first request that cannot be accommodated with an available server. For purposes of example, requests 612 and 614 require the same server. In order to preserve the FIFO nature of the queue request 612 must be serviced no later than request 614. Thus request 614 must remain in the queue for a subsequent service cycle. In addition, all transactions subsequent to request 614 must similarly remain in the queue for a subsequent service cycle in order to preserve the FIFO nature of the queue. Thus step 670 excludes transaction 614 and subsequent transactions from group 620 effectively shrinking group 620 to form group 630.

Step 680 determines if any transactions were excluded from the group. If so, then in one embodiment processing continues with step 660 to reassess agent assignments. Shrinking the group eliminates tentative agent-request assignments. The elimination of tentative request assignments makes more agents available for handling the requests and thus a better match between agents and requests may result by re-assessing the agent assignment with the smaller group of requests.

In the example of FIG. 6, the originally selected group 620 of transactions shrinks to just three requests illustrated as group 630. In step 690, the individual requests of group 630 are routed to their assigned agents as determined in step 660, leaving the remaining requests in queue 640.

In an alternative embodiment, no re-assessment is performed on the agent-request assignments in the event that the group is shrunk. This might be implemented for example when re-assessing the assignments unacceptably increases the service time.

In another variation, the queue discipline is quasi-group FIFO. Although the group initially selected is composed of the longest pending requests, only the requests that cannot be assigned in the current assignment cycle are excluded. Thus any other requests that can be handled are assigned to appropriate agents instead of being deferred to a subsequent assignment cycle for servicing. This helps to prevent a few requests from becoming a service bottleneck to subsequent requests. Requests that cannot be assigned in the current assignment cycle remain in the queue for assignment in the next assignment cycle.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
   a) queueing a request for an initial wait time until at least one agent is available for accepting the queued request;
   b) delaying assignment of the queued request for a delay time; and
   c) assigning the queued request to an available agent, wherein an elapsed time between queueing and assigning the queued request is a queue time.

2. The method of claim 1 wherein the delay time is a pre-determined availability pendency time.

3. The method of claim 1 wherein the delay time does not exceed a pre-determined availability pendency time, wherein the delay time is computed such that the queue time does not exceed a pre-determined limit if at least one agent is available.

4. The method of claim 1 wherein the delay time is computed such that the queue time is not less than a pre-determined queue time.

5. The method of claim 1 wherein the queued request is assigned to an agent other than the first available agent in step c).

6. The method of claim 1 wherein the request is a selected one of a voice telephone call, electronic mail message, facsimile transmission, and an internet communication.

7. The method of claim 1 wherein steps a)–c) are performed by an automated call distributor.

8. A method comprising the steps of:
   a) queueing at least one request; and
   b) assigning the queued request to an available agent only after a pre-determined queue time has elapsed.

9. The method of claim 8 wherein the queued request is assigned to an agent other than a first available agent in step b).

10. The method of claim 8 wherein the queued request is a selected one of a voice telephone communication, electronic mail communication, facsimile transmission, and an internet communication.

11. The method of claim 8 wherein steps a)–b) are performed by an automated call distributor.

12. A method comprising the steps of:
   a) queueing a plurality of requests for service;
   b) delaying the queued requests for a delay time after agents become available; and
   c) assigning each queued request to an available agent.

13. The method of claim 12 wherein a request having a greatest initial wait time before any agent is available is assigned to an agent other than the first available agent in step c).

14. The method of claim 12 wherein the plurality of requests comprise at least a selected one of a voice telephone communication, electronic mail communication, facsimile transmission, and an internet communication.

15. The method of claim 12 wherein step a) further comprises the step of implementing a first-in-first-out queue discipline such that the requests are assigned in request order to available agents.

16. The method of claim 12 wherein step a) further comprises the step of implementing a group first-in-first-out queue discipline, wherein each request of a first group of requests is assigned to an available agent no later than when each request of a second group of requests is assigned to an available agent when the second group of requests is queued subsequent to the first group of requests, wherein each request of a selected group of queued requests is assigned to a corresponding available agent substantially simultaneously.

17. The method of claim 12 wherein step a) further comprises the step of implementing a group first-in-first-out queue discipline, wherein for a group of requests having a first request queued before a second request the first and second requests are assigned agents substantially simultaneously when agents are available, wherein if no agent is available for the first request but at least one agent is available for the second request then the second request is assigned to the at least one available agent and the first request remains in the queue.

18. The method of claim 12 wherein the delay time of at least one queued request is a predetermined availability pendency time after at least one agent is available.

19. The method of claim 12 wherein the delay time of at least one queued request is selected to provide a queue time not less than a pre-determined queue time.

20. The method of claim 12 wherein the delay time of at least one queued request is no greater than a pre-determined availability pendency time, and does not result in a queue time in excess of a pre-determined limit when agents are available.

* * * * *